Sept. 24, 1935. A. SHOUP Re. 19,714
PHOTOPHONOGRAPHIC APPARATUS
Original Filed Oct. 8, 1932
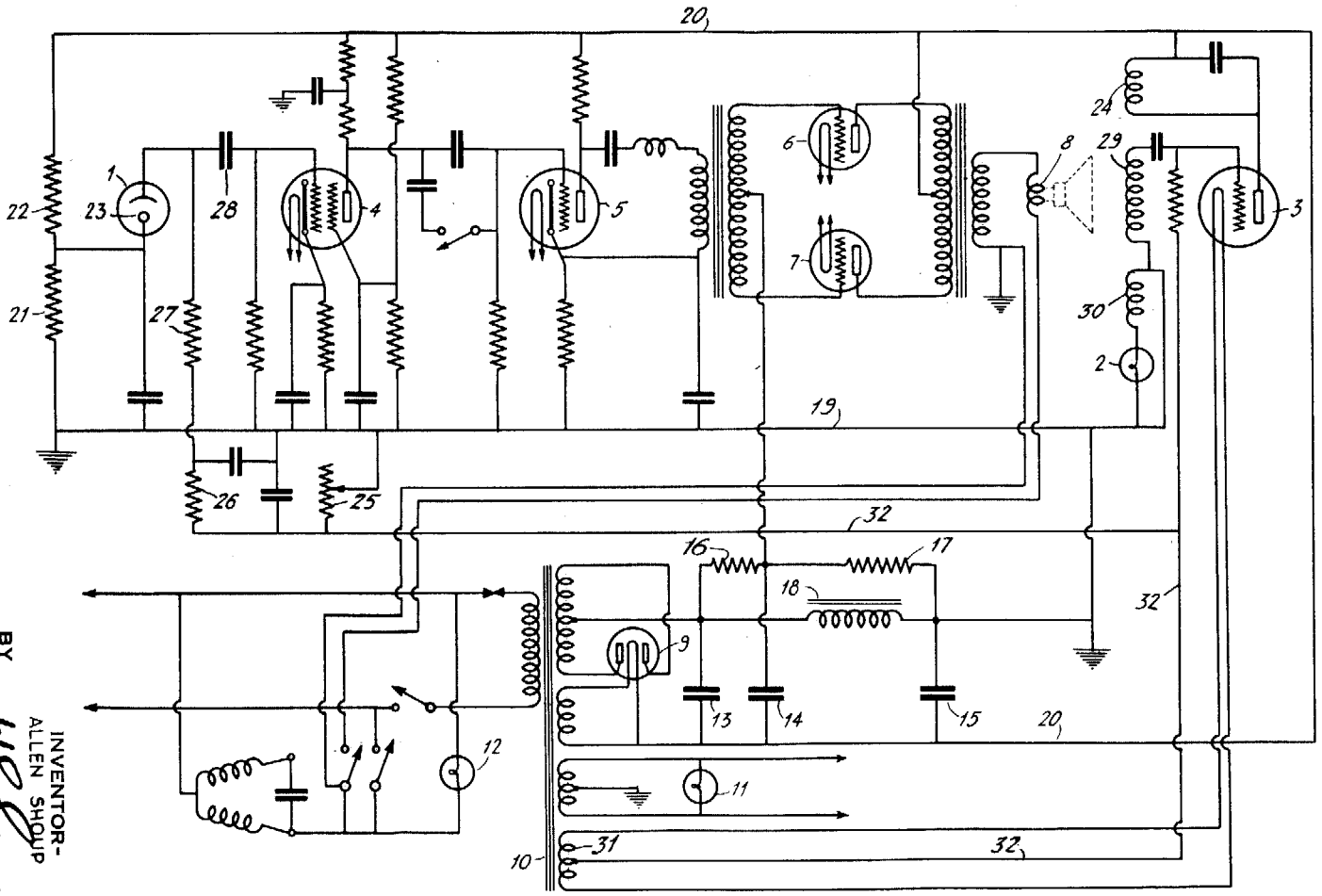
INVENTOR-
ALLEN SHOUP
BY H. S. Grover
ATTORNEY- Reissued Sept. 24, 1935

Re. 19,714

UNITED STATES PATENT OFFICE 19,714

PHOTOPHONOGRAPHIC APPARATUS

Allen Shoup, Oaklyn, N. J., assignor to Radio Corporation of America, a corporation of Delaware Original No. 1,974,900, dated September 25, 1934, Serial No. 636,803, October 8, 1932. Application for reissue June 26, 1935, Serial No. 28,590

4 Claims. (Cl. 179—100.3)

This invention relates to photophonographic apparatus and more particularly to devices for controlling the volume of sound reproduction in such apparatus.

It is customary in the talking motion picture art, as well as in the devices generally known as film phonographs, to provide a photoelectric cell for picking up light variations caused by variations in the light transmitting capacity of the portion of the film known as the sound track. In order to actuate the photoelectric cell, a constant light source is provided in the form of an incandescent lamp generally termed the "exciter lamp", from which light is concentrated in the form of a very fine line upon the sound track and the variable eclipsing of this light by the photographic impressions upon the sound track produces the variations in light striking the photocell which thereby cause corresponding electrical impulses. These electrical impulses are amplified through a suitable amplifying apparatus and transformed by an appropriate loudspeaker into sound waves.

The exciter lamp is required to provide illumination of very uniform intensity, and in my application, Serial No. 597,819 filed March 9, 1932 and upon which the present invention is an improvement, I describe the operation of the exciter lamp by a thermionic oscillator in order to avoid the hum which would be produced if the lamp were operated directly from alternating current and at the same time to avoid the necessity of direct current.

It is necessary from time to time to vary the volume of sound output from the apparatus by means of an appropriate volume control, and this has been heretofore accomplished in numerous ways as, for example, by varying the degree of amplification of the thermionic amplifying means used, in any of the numerous ways in which this can be accomplished, or in varying the energy transferred between the photoelectric cell and amplifying means, or between the amplifying means and the loudspeaker.

In the said application Serial No. 597,819, I describe an additional type of volume control, to wit: control of the volume by variation in the potential applied to the photoelectric cell.

In order to secure a maximum volume of sound reproductions from such apparatus it is necessary to operate the filament of the exciter lamp at a relatively high intensity, and likewise it is necessary to have a high potential available for application to the photocell. In the present invention I provide a volume control wherein both the exciter lamp intensity and the voltage applied to the photocell are simultaneously varied in order to control the volume.

One object of the invention is to provide a method and apparatus for securing the maximum life from the exciter lamp.

Another object of the invention is to provide a method and apparatus for securing the maximum life from the photocell.

Another object of the invention is to prevent excessive voltage from being applied to the photocell in an attempt to secure adequate volume when the exciter lamp brilliancy is inadequate.

Another object of the invention is to prevent excessive current being passed through the exciter lamp in order to raise the general volume level when the photocell is defective.

Another object of the invention is to provide a volume control which will produce a minimum of audible effect from its own operation.

Another object of the invention is the provision of method and apparatus for preventing an undesirably large requirement of power from the high frequency oscillator when a large amount of power is not required to produce the necessary volume.

Another object of the invention is to provide a volume control which is more efficient electrically than those of the prior art.

The single figure of the drawing shows my invention as applied to a commercial type of talking motion picture apparatus including the amplifier circuit of my application Serial No. 597,819.

In the drawing, 1 indicates the photocell, 2 indicates the exciter lamp and 3 indicates the oscillator tube which supplies current to the exciter lamp and the circuits of these three elements will be hereinafter described in more detail.

Amplifier tubes are indicated at 4, 5, 6 and 7 and, with their attendant circuits, constitute the thermionic amplifier which serves to amplify the impulses from the photocell 1 and transfer them to the loudspeaker 8. The circuit of the amplifier is immaterial so far as the subject-matter of the present application is concerned, and is described in more detail and claimed in my copending application above referred to and was described by me in a paper presented before the Society of Motion Picture Engineers on March 10, 1932. This amplifier is of the general type used commercially in what is known as the RCA Victor Type PG-38 Talking motion picture apparatus. At 9 is indicated the rectifying tube which rectifies the alternating current supplied through the transformer 10 to provide the plate voltage for the various amplifier tubes as well as for the photocell and the oscillator tube 3.

The transformer 10 also supplies current to a "threading" lamp 11 which provides general illumination about the machine for the operation thereof, and it also provides current for the filaments or heaters of the various amplifier tubes. The picture lamp of the projector is indicated at 12.

The rectified alternating current from the tube 9 passes through a filter comprising the condensers 13, 14 and 15, the resistors 16 and 17, and the inductance 18 which serve to smooth out the ripples in the current and the negative side then passes to ground as indicated and to the conductor 19 while the positive side passes to the conductor 20. The drop across the resistance 21 and 22 establishes the potential of the photocell anode 23 and current also passes from the conductor 20 through the coil 24 to the plate of the oscillator tube 3.

The volume control is accomplished through the variable resistor 25. In the photocell circuit, the resistor 25 is in series with the resistor 26 and 27 which connect the cathode of the photocell 1 to the negative conductor 19. Since the potential applied to the anode of the photocell is established by the drop across the resistors 21 and 22, and the photocell and the resistors 25, 26, and 27 are in series between this anode connection and the conductor 19, it will be apparent that any variation in the resistor 25 will cause a variation in the potential applied to the photocell 1, and thereby produce a corresponding variation in the output therefrom. This output is applied to the control grid of the amplifier tube 4 through a condenser 28.

The amplifier tube 4 is resistance-capacity coupled to the amplifier tube 5, which in turn is transformer-coupled to the push-pull "power" stage including the tubes 6 and 7, which feed the loudspeaker 8.

The exciter lamp 2 is, as previously stated, supplied with high-frequency current by the oscillator tube 3. The coil 24 in the plate circuit of the tube 3 is inductively coupled to the coil 29 in the grid circuit thereof, and these coils are inductively coupled to the output coil 30 which is connected to the exciter lamp 2. The plate current of the tube 3 is supplied through the conductor 20 and the coil 24, passes through the tube 3 to the filament thereof, and through the winding 31 of the transformer 10 to the conductor 32, whence it returns to the grounded conductor 19 through the volume-control resistor 25.

It will be apparent that any change in the adjustment of the variable resistor 25 will produce a corresponding change in the voltage applied between the plate and filament of the tube 3 and there will be a corresponding change in the power output of the oscillator and therefore in the brightness of the exciter lamp 2.

The resistor 25 may be an ordinary wire-wound rheostat having uniform steps of resistance since a wire-wound rheostat produces no difficulty from noise in this circuit and the desired exponential effect in the volume control is secured through the simultaneous control of the oscillator and the photocell.

The foregoing circuit and method of operation presents many advantages over volume controls of the prior art. In the first place with this system about five times more gain and about five times more life of the exciter lamp are possible than with the ordinary "grid" type of volume control. An additional advantage is that in order to secure normal volume both the photocell and the exciter lamp are operated at normal voltages irrespective of the line voltage applied to the apparatus, since an excessive line voltage will produce an undesirable volume of reproduced sound and the operator, in decreasing the volume to a more appropriate value, will necessarily decrease the photocell and exciter lamp voltages to similarly appropriate values.

It will be apparent that the scope of my invention is not limited to its application in the type of amplifier shown or to the use with the particular type of photocell or exciter lamp shown. For example, the variable resistor might be placed in the positive instead of the negative connection of both the photocell and the oscillator tube, although this is not the preferred form of the invention on account of the high potential at which the variable resistor 25 is necessarily maintained, with a corresponding danger of shock to the operator. If the exciter lamps were of a high voltage type adapted to operate from the direct current supplied through the rectifier 9 and its attendant filter, the resistor 25 would of course be so located as to control the exciter lamp voltage directly, in substantially the same manner that it now controls the photocell voltage. If the exciter lamp were operated from an independent source of power such, for example, as a storage battery or a stepdown transformer, a separate resistor would be used between the exciter lamp and the said separate source of power and this resistor would then be connected mechanically in tandem with the resistor 25 so that a unitary control means would simultaneously vary both the photocell and the exciter lamp voltages.

What I claim is:

1. Photophonographic apparatus comprising a photoelectric means, a light source for exciting said photoelectric means and unitary means for controlling the brightness of said light source and the potential applied to said photoelectric means.

2. Photophonographic apparatus comprising a photoelectric means, a light source for exciting said photoelectric means and unitary means for simultaneously controlling the brightness of said light source and the potential applied to said photoelectric means.

3. Photophonographic apparatus comprising a photoelectric cell, an exciter lamp, a thermionic oscillator arranged to supply said exciter lamp with high frequency current, and a single means for controlling the current supplied to said photocell and said oscillator.

4. The method of controlling the volume of sound reproduction for photophonographic apparatus comprising the step of varying both the electrical and the luminous excitation of a photoelectric cell simultaneously in the same direction.

ALLEN SHOUP.